(12) United States Patent
Ananthapur Bache et al.

(10) Patent No.: US 10,417,055 B2
(45) Date of Patent: Sep. 17, 2019

(54) RUNTIME MOVEMENT OF MICROPROCESS COMPONENTS

(71) Applicant: International Business Machines Corporation, Armonk, NY (US)

(72) Inventors: Vijay Kumar Ananthapur Bache, Bangalore (IN); Vijay Ekambaram, Tamilnadu (IN); Sarbajit K. Rakshit, Kolkata (IN); Saravanan Sadacharam, Chennai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 136 days.

(21) Appl. No.: 15/404,132

(22) Filed: Jan. 11, 2017

(65) Prior Publication Data

US 2018/0196667 A1   Jul. 12, 2018

(51) Int. Cl.
*G06F 9/50* (2006.01)
*G06N 20/00* (2019.01)

(52) U.S. Cl.
CPC ........... *G06F 9/5066* (2013.01); *G06N 20/00* (2019.01)

(58) Field of Classification Search
CPC ...................................................... G06F 9/24
See application file for complete search history.

(56) References Cited

U.S. PATENT DOCUMENTS 9,009,294 B2   4/2015 Dawson et al.
9,229,784 B2   1/2016 DeJana et al.
(Continued)

FOREIGN PATENT DOCUMENTS

CN   101938416 A   1/2011
CN   102209100 A   10/2011
(Continued)

OTHER PUBLICATIONS

Software Engineering Institute, Carnegie Mellon, "More Accurate Prediction of Resource Consumption Through Architecture Analysis using MOdel-Based Engineering Tools", retrieved from the Internet on Jun. 9, 2016, URL: <http://www.sei.cmu.edu/library/assets/MBE_Resource1.pdf>.
(Continued)

*Primary Examiner* — Sisley N Kim
(74) *Attorney, Agent, or Firm* — Law Offices of Ira D. Blecker, P.C.

(57) ABSTRACT

A computer-implemented method of movement of microprocess components in a computer environment which includes: dividing a process into a plurality of microprocess components, the process to be run in a computer environment; creating a plurality of microprocess component placement combinations for the microprocess components, each combination comprising a placement of two or more microprocessor components in the computer environment; computing a utility score for each combination of microprocess components based on minimizing an end to end time for the combination of microprocess components and resource used for the combination of microprocess components; choosing the microprocessor component placement combination that has the best utility score; and assigning the microprocess component placement combination with the best utility score to placement in the computer environment.

14 Claims, 6 Drawing Sheets

(56) References Cited

U.S. PATENT DOCUMENTS

| | | | |
|---|---|---|---|
| 2005/0022188 A1* | 1/2005 | Tameshige | G06F 9/5055 718/100 |
| 2010/0332456 A1 | 12/2010 | Prahlad et al. | |
| 2011/0145037 A1* | 6/2011 | Domashchenko | G06Q 10/06 705/7.27 |
| 2011/0246653 A1* | 10/2011 | Balasubramanian | G06F 17/5045 709/226 |
| 2016/0253391 A1* | 9/2016 | Burns | G06F 17/30507 707/722 |
| 2016/0350146 A1* | 12/2016 | Udupi | G06F 9/45558 |
| 2016/0378557 A1* | 12/2016 | Asahara | G06F 9/5027 718/105 |

FOREIGN PATENT DOCUMENTS

| | | |
|---|---|---|
| CN | 204595833 U | 8/2015 |
| CN | 204605562 U | 9/2015 |

OTHER PUBLICATIONS

Ling Huang et al., "Predicting Execution Time of Computer Programs Using Sparse Polynomial Regression", retrieved from the Internet on Jun. 9, 2016, URL: <http://papers.nips.cc/paper/4145-predicting-execution-time-of-computer-programs-using-sparse-%20polynomial-regression.pdf>.

Chang Yun Park, "Predicting Program Execution Times by Analyzing Static and Dynamic Program Paths", Real Time Systems, 5, 31-62 (1993).

\* cited by examiner

RUNTIME MOVEMENT OF MICROPROCESS COMPONENTS

BACKGROUND

The present exemplary embodiments pertain to adaptive runtime movement of microprocess components in a hybrid cloud based on the required needs of a data analytics service in an automated way.

A hybrid cloud is a combination of a private cloud accessible only by an enterprise, such as a business or corporation, and a public cloud that is open for public use.

Solution as a service is a business model to provide industry specific solution as a service on a cloud. Solution as a service goes beyond software as a service and provides specific solutions on a pay-per-use basis. So-call Big Data Analytics and Data Analytics based solutions are some examples of services provided in a solution as a service model.

Most of the analytics solutions need transactional data, which may be in terabytes or more, to provide insights or actions with respect to the transactional data. Such a scenario requires a lot of data to be transferred between the enterprise and the solution that is hosted on the public cloud to realistically provide high end big data analytic solutions on the public cloud.

BRIEF SUMMARY

The various advantages and purposes of the exemplary embodiments as described above and hereafter are achieved by providing, according to an aspect of the exemplary embodiments, a computer-implemented method of movement of microprocess components in a computer environment comprising: dividing a process into a plurality of microprocess components, the process to be run in a computer environment; creating a plurality of microprocess component placement combinations for the microprocess components, each combination comprising a placement of two or more microprocessor components in the computer environment; computing a utility score for each combination of microprocess components based on minimizing an end to end time for the combination of microprocess components and resource used for the combination of microprocess components; choosing the microprocessor component placement combination that has the best utility score; and assigning the microprocess component placement combination with the best utility score to placement in the computer environment.

According to another aspect of the exemplary embodiments, there is provided a system for movement of microprocess components in a computer environment comprising: a cognitive choreographer for scheduling placement of the microprocess components in the computer environment; a computer readable storage medium that stores instructions including instructions of the cognitive choreographer; and a processor that executes the instructions to perform the following functions: divide a process into a plurality of microprocess components, the process to be run in a computer environment; create a plurality of microprocess component placement combinations for the microprocess components, each combination comprising a placement of two or more microprocessor components in the computer environment; compute a utility score for each combination of microprocess components based on minimizing an end to end time for the combination of microprocess components and resource used for the combination of microprocess components; choose the microprocessor component placement combination that has the best utility score; and assign the microprocess component placement combination with the best utility score to placement in the computer environment.

According to a further aspect of the exemplary embodiments, there is provided a computer program product of movement of microprocess components in a computer environment, the computer program product comprising a computer readable storage medium having program instructions embodied therewith, the program instructions executable by a processor to cause the processor to perform a method comprising: dividing a process into a plurality of microprocess components, the process to be run in a computer environment; creating a plurality of microprocess component placement combinations for the microprocess components, each combination comprising a placement of two or more microprocessor components in the computer environment; computing a utility score for each combination of microprocess components based on minimizing an end to end time for the combination of microprocess components and resource used for the combination of microprocess components; choosing the microprocessor component placement combination that has the best utility score; assigning the microprocess component placement combination with the best utility score to placement in the computer environment.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Solution as a Service (SlaaS): the capability provided to the consumer is to provide a complete solution to the consumer using the provider's SaaS applications running on the provider's cloud infrastructure. The consumer does not manage or control the underlying cloud infrastructure including network, servers, operating systems, storage, or even individual application capabilities, with the possible exception of limited user-specific application configuration settings.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
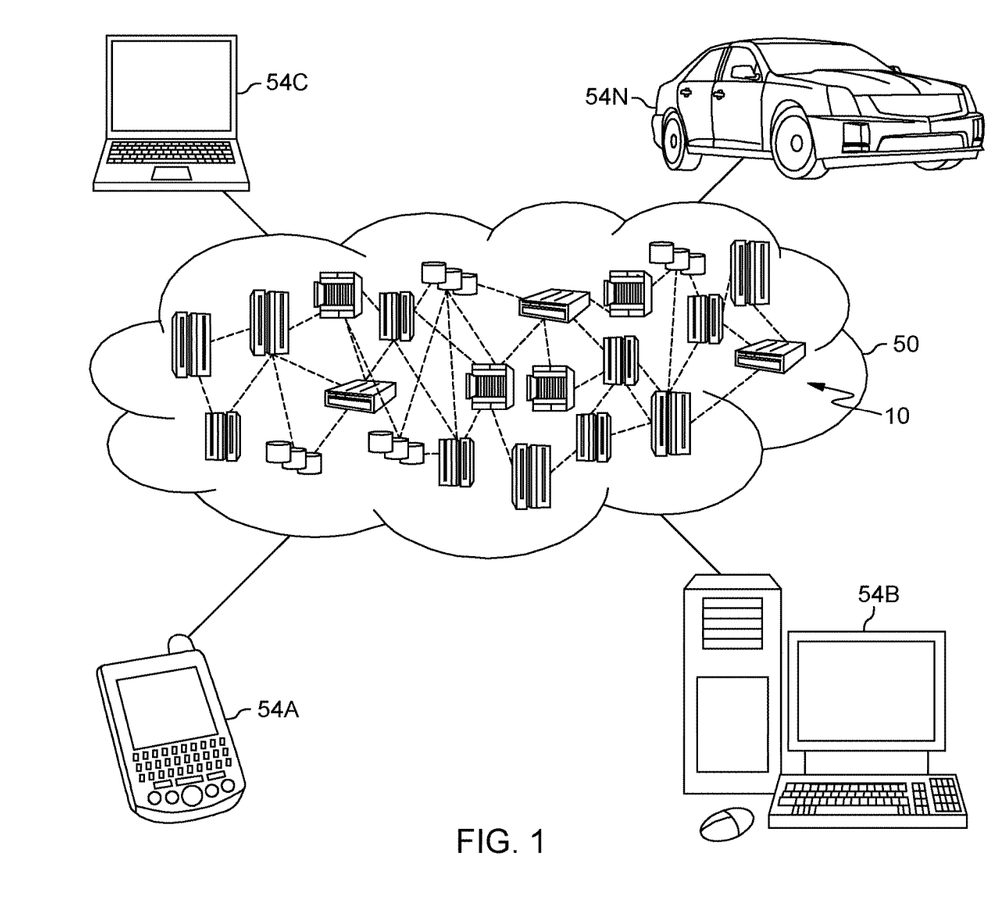
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
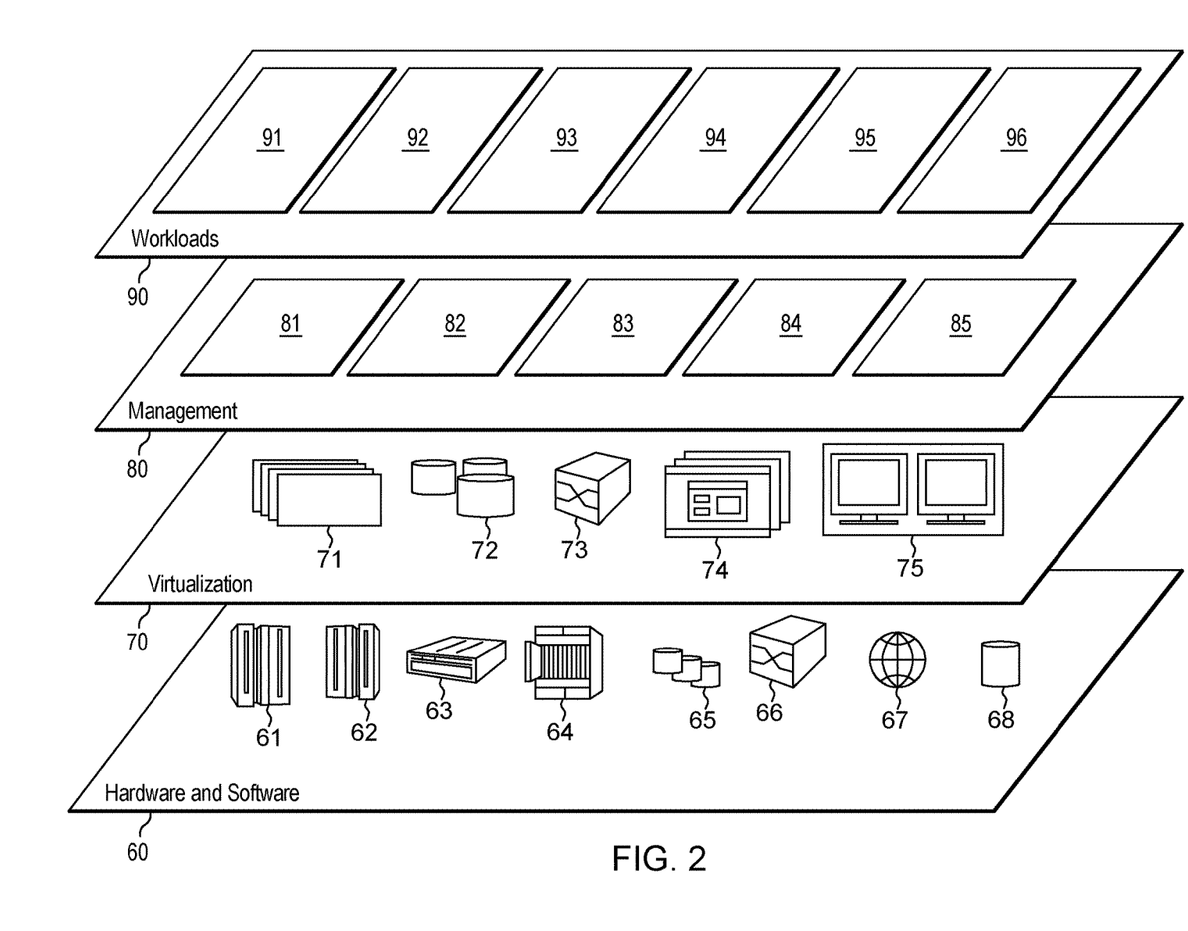
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and solution service delivery 96.

Figure 3:
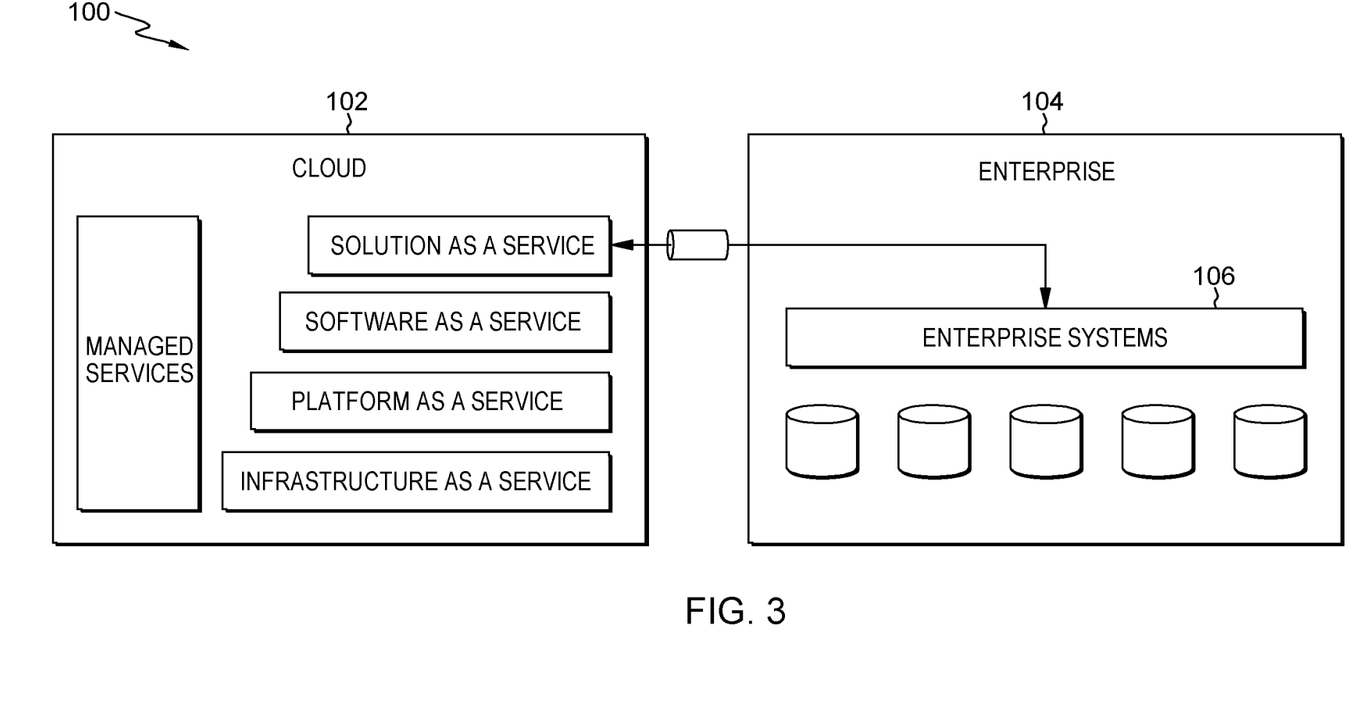
FIG. 3 is an illustration of a hybrid cloud.

Referring now to FIG. 3, FIG. 3 is an illustration of a hybrid cloud 100 in which a variety of services (as described above) may be hosted in the public cloud 102 and provided to the private cloud 104 of the enterprise. Separate from the private cloud or even hosted in the private cloud, the enterprise may have enterprise systems 106 to perform various computing functions as the need may require. The exemplary embodiments may pertain to the solution as a service (hereafter SlaaS) and in a preferred embodiment may pertain only to SlaaS.

The process provided by SlaaS may be divided into microprocesses. The overall solution provided by SlaaS is the process. Each microprocess is designed to perform a task. The granularity of what is a microprocess may be decided by the SlaaS developer. An important point here is that the overall process is divided into subprocesses, called microprocesses here, with the definition of what is a microprocess determined by the SlaaS developer.

In a typical arrangement of microprocesses, one or more data intensive microprocesses may be hosted in the private cloud and analytics microprocesses may be hosted in the public cloud, depending on the requirements of the solution. Further in the typical arrangement of microprocesses, the microprocesses are statically fixed to the private cloud or to its tier in the public cloud with fixed connection links between each microprocess. A "tier" refers to a particular location or layer in the cloud where various components of a cloud system may reside. A hybrid cloud could have many tiers. For example, there could be a client server in the private cloud and there could be an analytics server, GPU, Hadoop in the various tiers of the public cloud. Based on need, there could be several tiers.

Based on user requirement, data cost, power requirement, security concerns, processing of data in big data analytics software could happen in any tier of the cloud. In the current hybrid cloud architecture, placements of microprocess components in big data analytics software is hardcoded with the tier of the cloud which is not the best fit for all scenarios.

Figure 4:
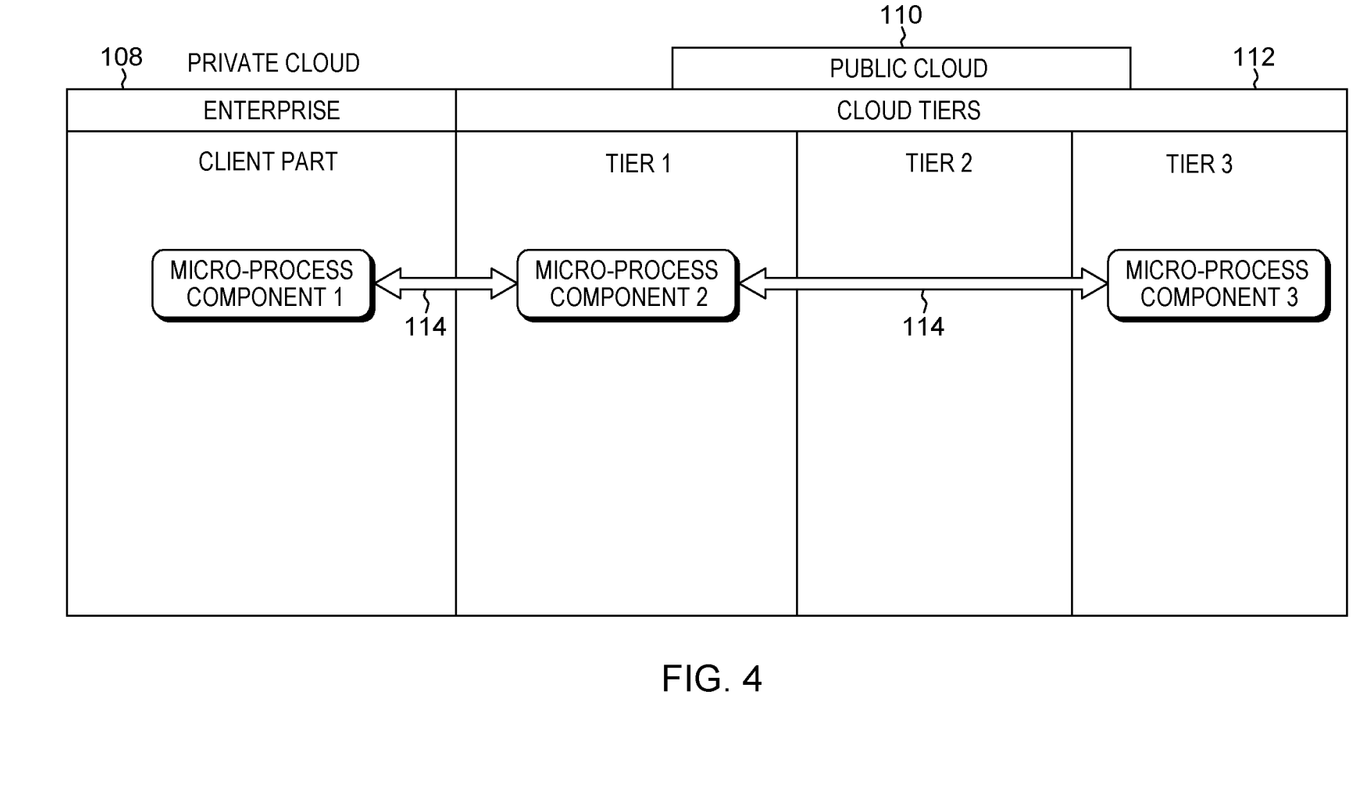
FIG. 4 is an illustration of one functional layout of a solution as a service.

Referring to FIG. 4, there is illustrated an example of one functional layout of a solution as a service. On the left side are functions that may be performed by the enterprise 108 in the private cloud. Among these functions may be the analytics software part performed by the client. On the right side are the functions that may be performed in the cloud 110 and, more specifically, in the various cloud tiers 112. The various cloud tiers in the public cloud may be referred to as tier 1, tier 2, tier 3, etc which represent the various hardware/software components in the public cloud such as analytics server, GPU, Hadoop and other components.

In the example shown in FIG. 4, microprocess component 1 is performed on the enterprise 108. This might be the case if there is a large amount of data so that the data is processed and necessary features are extracted for further processing in the cloud 110. Microprocess component 2 is processed in tier 1 of the cloud tiers 112 while microprocess component 3 is processed in tier 3 of the cloud tiers 112. Microprocess components 2 and 3, may for example process the data from microprocess component 1. The microprocess components are statically fixed based on pre-defined requirements. Further, each of the microprocess components have fixed connections links 114. Accordingly, such an arrangement as shown in FIG. 4 is not flexible to handle changed user requirements over time. In other words, placements of microprocess components may be hardcoded with the cloud tier which may result in a less than ideal fit for all solution scenarios.

There is proposed in the exemplary embodiments a cognitive choreographer which controls the positioning of microprocess components in various tiers and also enables runtime communication channels between the microprocess components based on the particular user requirements. The microprocess components are deployed between the public cloud or the private cloud dynamically based on various parameters that define the microprocess. For example, if the microprocess component is a data intensive operation, it is deployed closer to the data in the private cloud while a computation intensive microprocess component can run on the public cloud.

Figure 5:
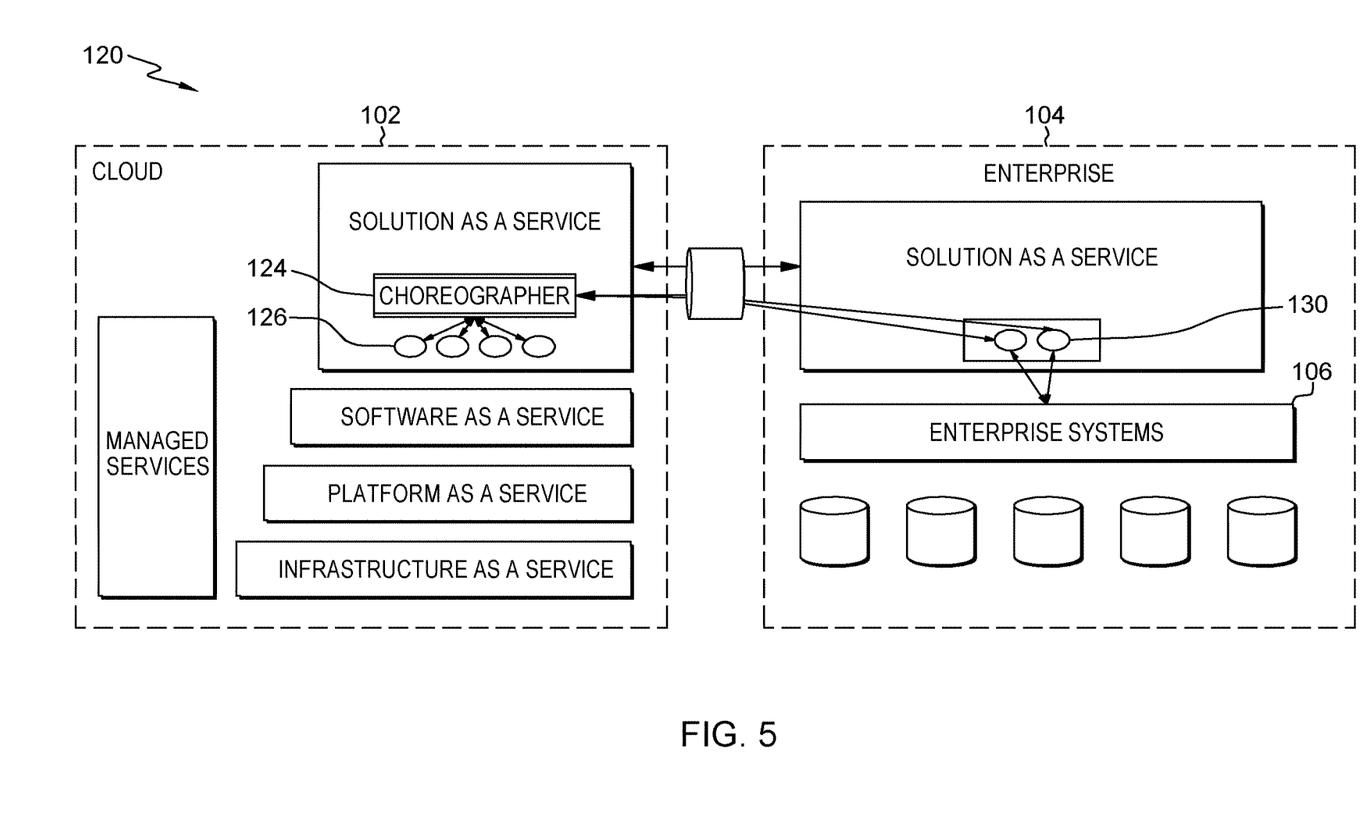
FIG. 5 is an illustration of a hybrid cloud containing a choreographer.

FIG. 5 is a modification of FIG. 3 and is an illustration of a hybrid cloud 120 containing a choreographer 124. The choreographer 124 may choreograph microprocess components 126 in the public cloud 102. The choreographer 124 may also choreograph microprocess components 130 in the private cloud 104.

Figure 6:
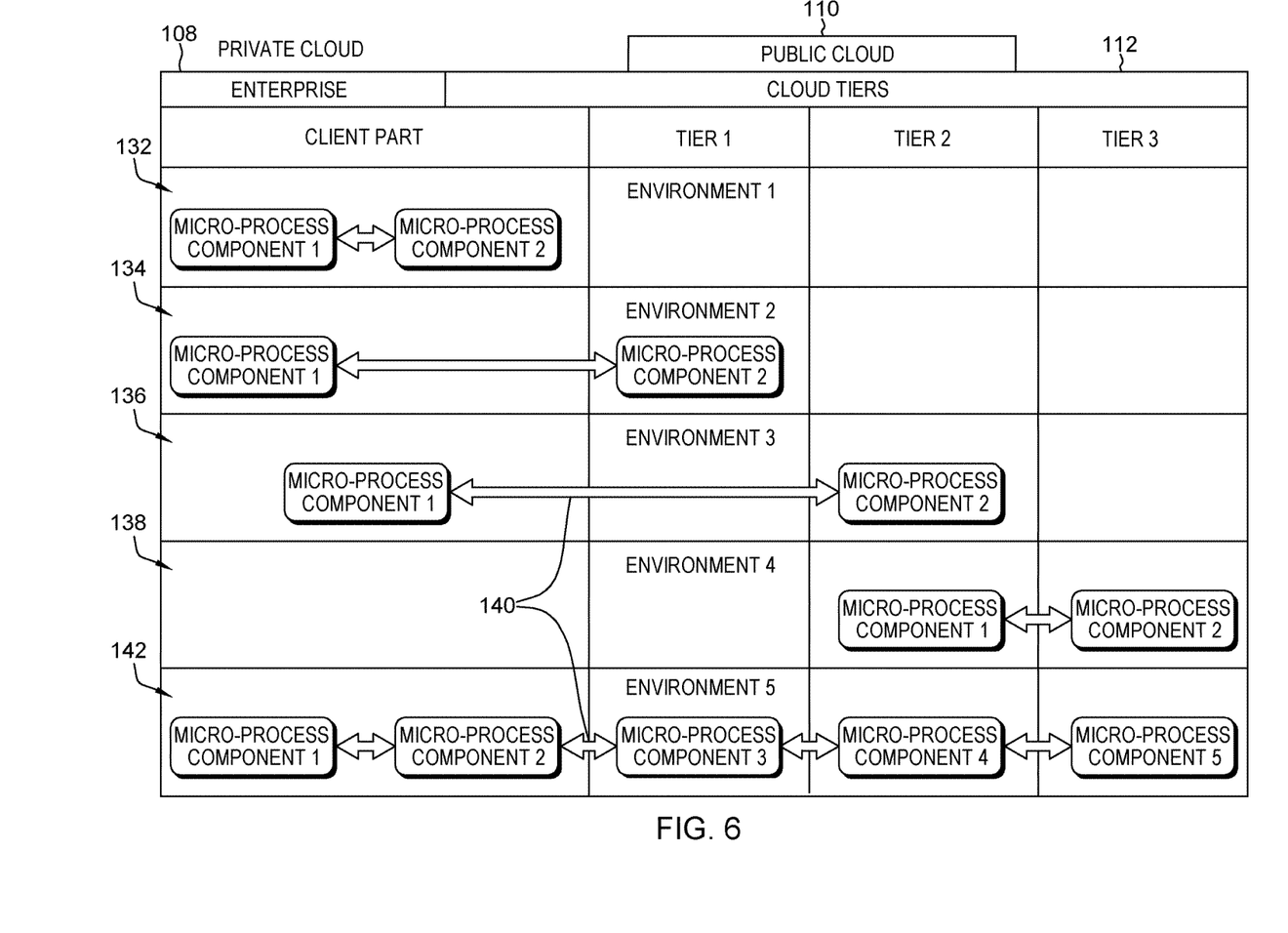
FIG. 6 is an illustration of a functional layout of a solution as a service according to the exemplary embodiments.

The choreographer schedules the placement for each of the microprocess components. The choreographer 124 creates all possible combination of microprocess component placements. FIG. 6 is an example of possible combinations of two microprocess components. In one environment, indicated by 132, microprocess components 1 and 2 are both placed in the private cloud of the enterprise 108. In a second environment 134, microprocess component 1 is placed in the private cloud of the enterprise 108 while microprocess component 2 is placed in the tier 1 public cloud tier. In a third environment 136, microprocess component 1 is placed in the private cloud of the enterprise 108 while microprocess component 2 is placed in the tier 2 public cloud tier. In a further environment 138, microprocess component 1 is placed in the tier 2 public cloud tier while microprocess component 2 is placed in the tier 3 public cloud tier.

It should be understood that the choreographer 124 is not limited to just paired combinations. The choreographer 124 is capable of making any combination of microprocesses including up to the number of microprocesses in the solution. If there are "n" number of microprocess components, the choreographer 124 may consider n! (n factorial) combinations of components.

A further example of a combination created by the choreographer that is not limited to paired combinations is illustrated in FIG. 6 wherein in environment 142, microprocess components 1 and 2 may be placed in the private cloud of the enterprise 108 while microprocess component 3 may be placed in the tier 1 public cloud tier, microprocess component 4 may be placed in the tier 2 public cloud tier and microprocess component 5 may be placed in the tier 3 public cloud tier.

After creating all of the combinations, a utility score is computed for each of the possible combinations. The user input constraint is included and is based on the data size to be analyzed, data cost, time constraint, power/resource availability and security/privacy rules of the data. The problem could be formalized as a scheduling algorithm with the utility constraint that the end to end time and resource used should be minimized. The end to end time is the delay time between a service request from the end user to the SlaaS provider and receiving a service response from the SlaaS provider to the end user.

One approach to computing the utility score is to compute an average end to end time and resources used for each combination sort the combination based the end to end times and resources used and then provide the best one as an output. Various other heuristics could also be used. The highlevel objective function is to minimize end to end time and resources used. End to end time has high priority as compared to resources used in case of a tie.

An upper and lower bound for execution time and resource consumed for microprocess components may be predicted using various learning models. For example, there are conventional machine learning algorithms which could predict runtime properties of the microprocess components, such as total execution time and resources used, without actually executing the microprocess components. Such machine learning algorithms may be used as an alternate method to estimate the utility score for each combination of microprocess components.

The choreographer sorts the available combinations based on the computed utility score and chooses the one with the best utility score. In one exemplary embodiment, the best utility score would be the maximum utility score.

Based on the combination with the best utility score, the microprocess components are assigned to the private cloud of the enterprise and/or the cloud tier by the choreographer 124.

There could be many links between various microprocess components which could be affected because of the placement of the microprocess components. In order to make the movement of microprocess components in tiers easy, microprocess components are not directly coupled to each other. The microprocess components are coupled through elastic adapters. Communication between each pair of microprocess components will have its own elastic adapter.

The elastic adapter is designed without any tier abstraction and could link between two microprocessor components irrespective of their tiers. The hybrid cloud will not have any fixed point-to-point communication across microprocess components. That is, there will be no static links between adapter components. All communication happens through elastic adapters. Elastic adapters are software components whose primary function is to enable point-to-point connection between any two microprocess components regardless of their respective tier locations. Communication between microprocessor components through an elastic adapter could be configured from manifest or some configuration file which could be updated at runtime. The elastic adapter is a communication link between two microprocess components which may be instantiated at runtime.

The selection of linked microprocess components and the configuring of the elastic adapter may be done at framework setup but keeps changing as the user requirements change. In this respect, the placement of the microprocess components and the configuring of elastic adapters between the microprocess components both automatically and dynamically adapt to changing requirements.

The choreographer 124 configures the elastic adapters between every pair of microprocess components based on their tier information. FIG. 6 illustrates the possibilities for elastic adapters 140 between the various microprocess components.microprocess component 1 and microprocess component 2.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:
1. A computer-implemented method of movement of microprocess components in a computer environment comprising:
dividing a process into a plurality of microprocess components, the process to be run in a computer environment wherein the computer environment is a hybrid cloud environment comprising a public cloud and a private cloud;
creating a plurality of microprocess component placement combinations for the microprocess components, each combination comprising a placement of two or more microprocessor components in the computer environment;
directly connecting by a communication link each microprocess component in the microprocess component placement combination with the other microprocess component in the microprocess component placement combination such that the communication link enabling point-to-point connection between the microprocess components in the microprocess component placement combination, wherein the plurality of microprocess components are deployed among and between the public cloud and the private cloud dynamically;
computing a utility score for each combination of microprocess components and communication link based on minimizing an end to end time for the combination of microprocess components and resource used for the combination of microprocess components;
choosing the microprocess component placement combination and communication link that has the best utility score; and
assigning the microprocess component placement combination and communication link with the best utility score to placement in the computer environment.

2. The method of claim 1 further comprising dynamically changing the placement of the combination of microprocess components to adapt to a change in requirements by a user of the process.

3. The method of claim 1 further comprising dynamically changing the placement of the combination of microprocess components and dynamically changing connection points of each communication link with each microprocess component to adapt to a change in requirements by a user of the process.

4. The method of claim 1 wherein computing a utility score includes a machine learning algorithm to predict runtime properties of the microprocess component placement combination without executing the microprocess component placement combination.

5. The method of claim 1 further comprising executing the microprocess component placement combination.

6. A system for movement of microprocess components in a computer environment comprising:
- a cognitive choreographer for scheduling placement of the microprocess components in the computer environment wherein the computer environment is a hybrid cloud environment comprising a public cloud and a private cloud;
- a computer readable storage medium that stores instructions including instructions of the cognitive choreographer; and
- a processor that executes the instructions to perform the following functions:
- divide a process into a plurality of microprocess components, the process to be run in a computer environment;
- create a plurality of microprocess component placement combinations for the microprocess components, each combination comprising a placement of two or more microprocessor components in the computer environment;
- directly connect by a communication link each microprocess component in the microprocess component placement combination with the other microprocess component in the microprocess component placement combination such that the communication link enables point-to-point connection between the microprocess components in the microprocess component placement combination, wherein the plurality of microprocess components are deployed among and between the public cloud and the private cloud dynamically;
- compute a utility score for each combination of microprocess components and communication link based on minimizing an end to end time for the combination of microprocess components and resource used for the combination of microprocess components;
- choose the microprocess component placement combination and communication link that has the best utility score; and
- assign the microprocess component placement combination and communication link with the best utility score to placement in the computer environment.

7. The system of claim 6 further comprising the processor to perform the function to dynamically change the placement of the combination of microprocess components to adapt to a change in requirements by a user of the process.

8. The system of claim 6 further comprising the processor to perform the functions to dynamically change the placement of the combination of microprocess components and dynamically change connection points of each communication link with each microprocess component to adapt to a change in requirements by a user of the process.

9. The system of claim 8 wherein compute a utility score includes a machine learning algorithm to predict runtime properties of the microprocess component placement combination without executing the microprocess component placement combination.

10. The system of claim 6 further comprising the processor to perform the function to execute the microprocess component placement combination.

11. A computer program product of movement of microprocess components in a computer environment, the computer program product comprising a computer readable storage medium having program instructions embodied therewith, the program instructions executable by a processor to cause the processor to perform a method comprising:
- dividing a process into a plurality of microprocess components, the process to be run in a computer environment wherein the computer environment is a hybrid cloud environment comprising a public cloud and a private cloud;
- creating a plurality of microprocess component placement combinations for the microprocess components, each combination comprising a placement of two or more microprocessor components in the computer environment;
- directly connecting by a communication link each microprocess component in the microprocess component placement combination with the other microprocess component in the microprocess component placement combination such that the communication link enabling point-to-point connection between the microprocess components in the microprocess component placement combination, wherein the plurality of microprocess components are deployed among and between the public cloud and the private cloud dynamically;
- computing a utility score for each combination of microprocess components and communication link based on minimizing an end to end time for the combination of microprocess components and resource used for the combination of microprocess components;
- choosing the microprocess component placement combination and communication link that has the best utility score; and
- assigning the microprocess component placement combination and communication link with the best utility score to placement in the computer environment.

12. The computer program product of claim 11 further comprising dynamically changing the placement of the combination of microprocess components and dynamically changing connection points of each communication link with each microprocess component to adapt to a change in requirements by a user of the process.

13. The computer program product of claim 11 wherein computing a utility score includes a machine learning algorithm to predict runtime properties of the microprocess component placement combination without executing the microprocess component placement combination.

14. The computer program product of claim 11 further comprising executing the microprocess component placement combination.

* * * * *